Figure 1:
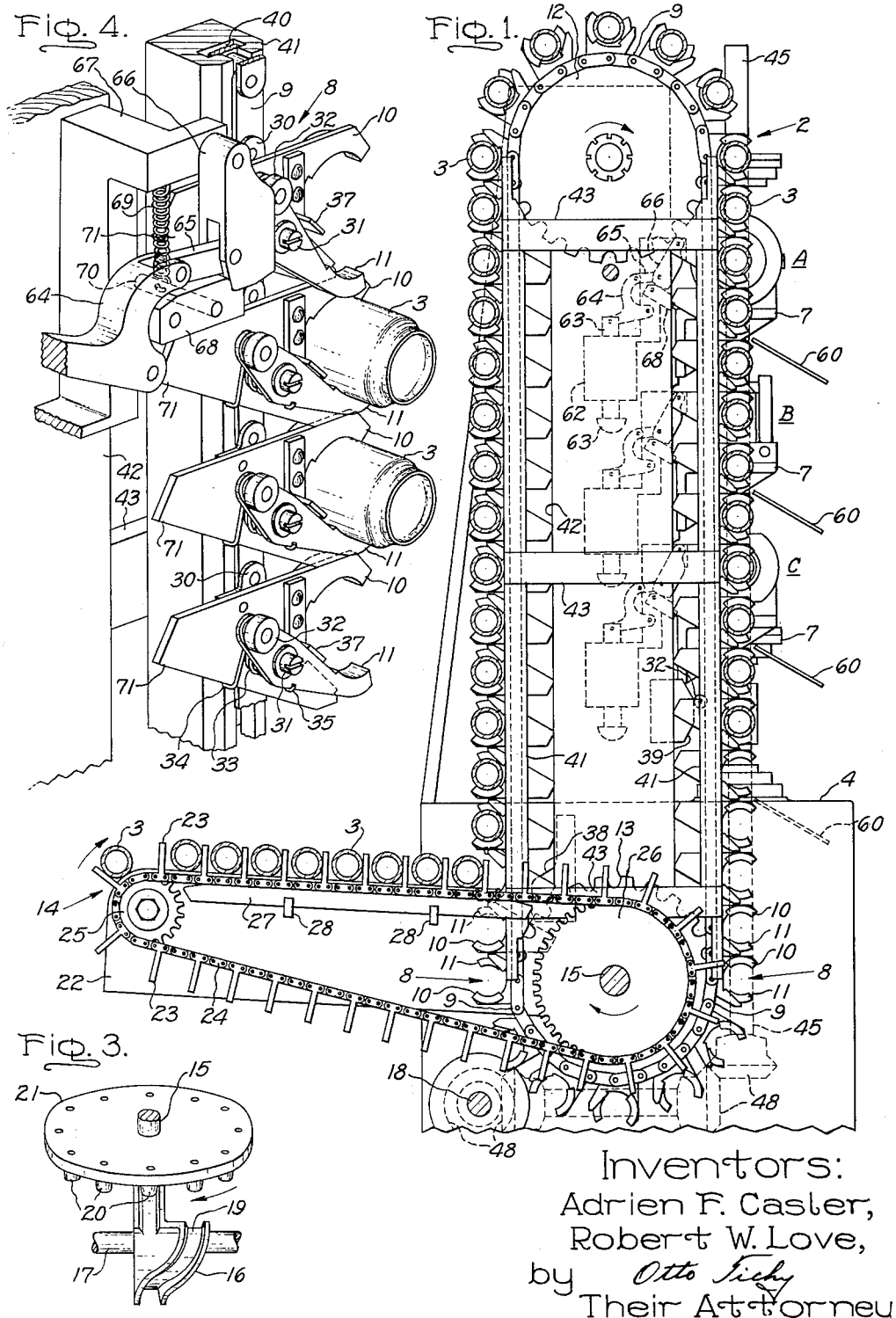

March 13, 1962  A. F. CASLER ET AL  3,024,905

TUBE END INSPECTION APPARATUS

Filed May 25, 1959  4 Sheets-Sheet 1

Inventors:
Adrien F. Casler,
Robert W. Love,
by Otto Tichy
Their Attorney

Inventors:
Adrien F. Casler,
Robert W. Love,
by Otto Tichy
Their Attorney

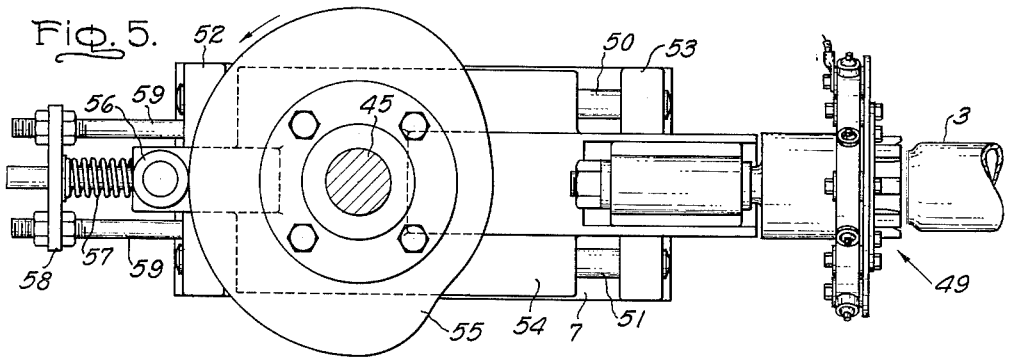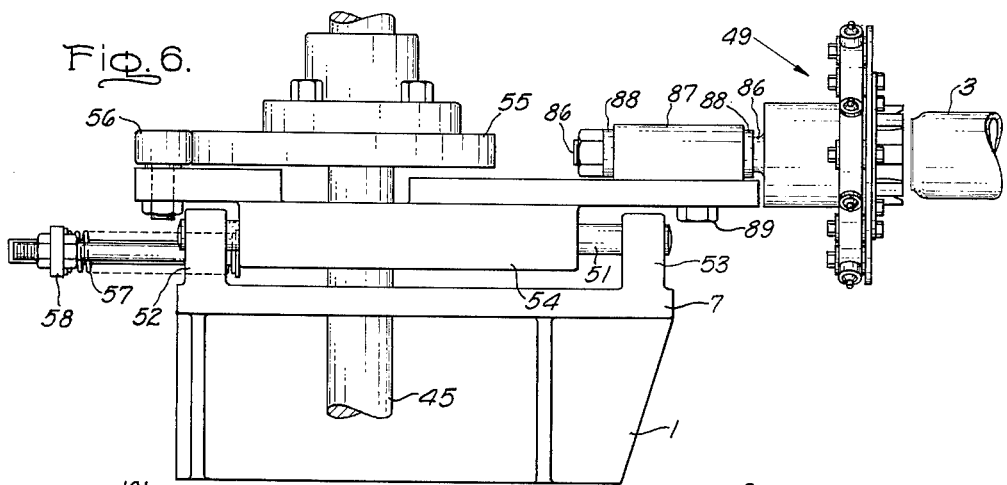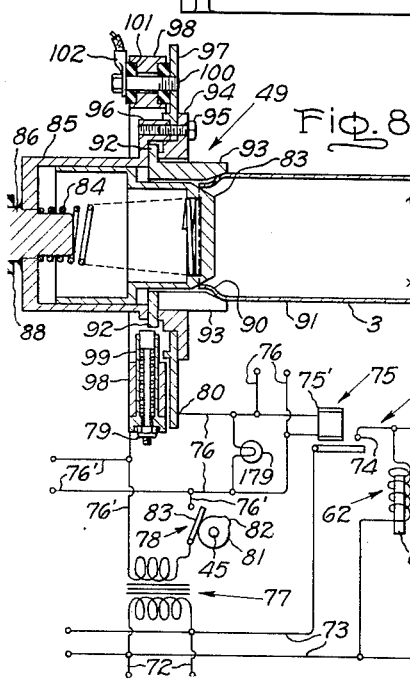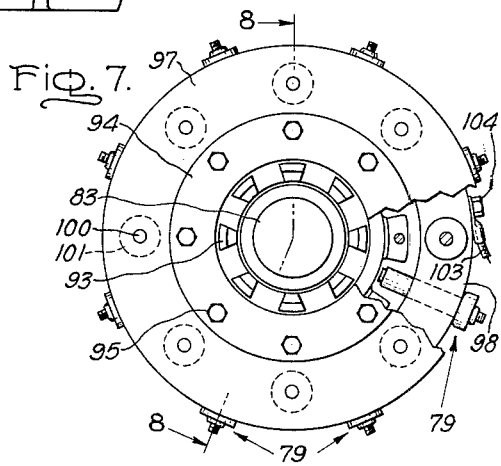

March 13, 1962  A. F. CASLER ET AL  3,024,905
TUBE END INSPECTION APPARATUS
Filed May 25, 1959  4 Sheets-Sheet 4
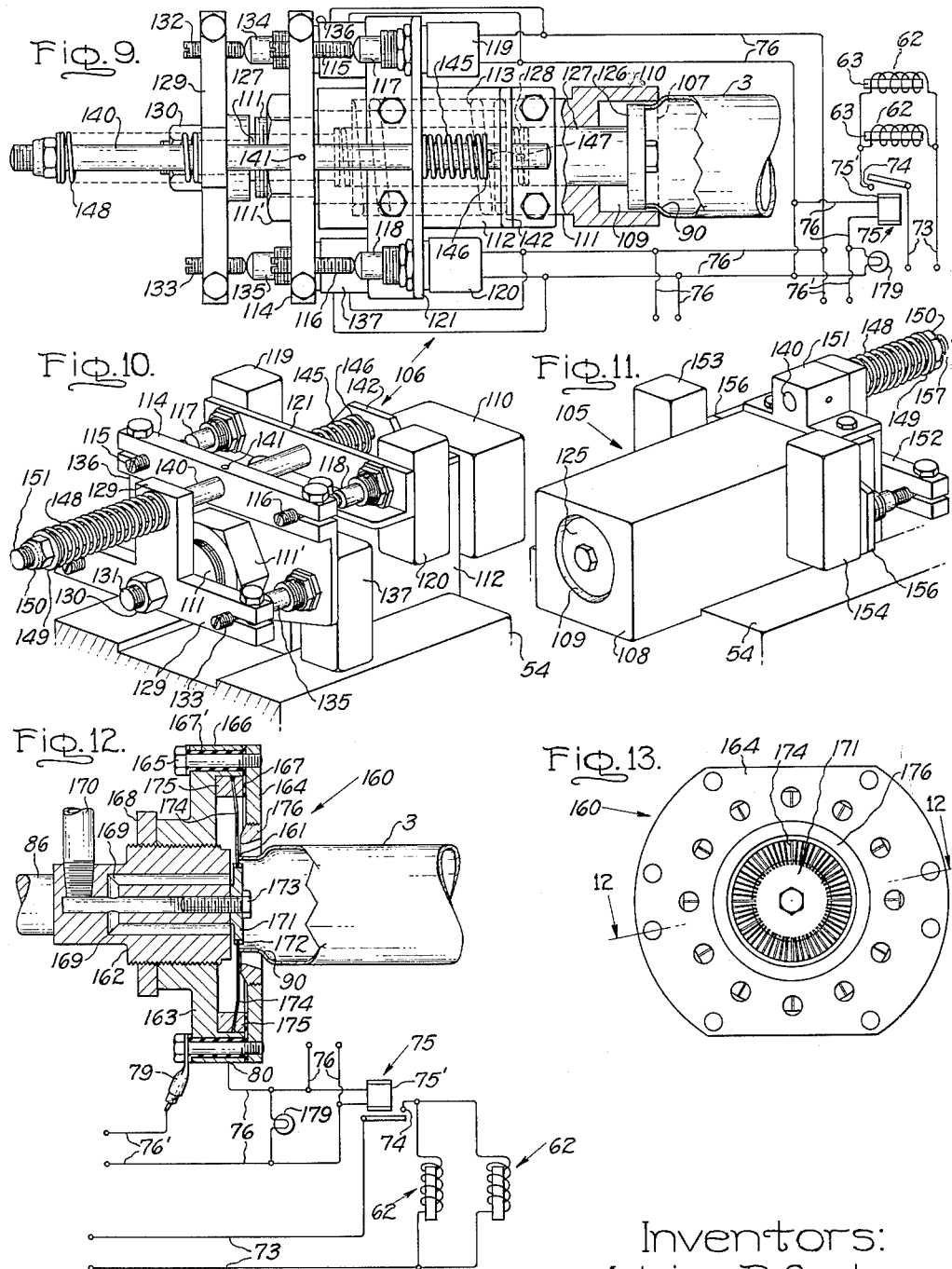
Inventors:
Adrien F. Casler,
Robert W. Love,
by Otto Fichy
Their Attorney

United States Patent Office 3,024,905
Patented Mar. 13, 1962

3,024,905
TUBE END INSPECTION APPARATUS
Adrien F. Casler, Chardon, and Robert W. Love, Cleveland Heights, Ohio, assignors to General Electric Company, a corporation of New York
Filed May 25, 1959, Ser. No. 815,438
5 Claims. (Cl. 209—80)

The present invention relates to apparatus for inspecting elongtaed open ended tubular glass envelopes for electric lamps and particularly to apparatus for inspecting such envelopes having annularly reduced ends to which the flares of internally extending glass stems are fusion sealed and to which electrically conducting bases are cemented in the manufacture of electric lamps, such as fluorescent discharge lamps and elongated incandescent lamps.

In the mass production of electric lamps including tubular envelopes of this type the sealing of the glass stems into the annularly reduced open ends of the tubular glass envelope and the cementing of the bases on the envelope ends after the stems are sealed therein is done by high speed, precision lamp making machines. For the successful operation of such lamp making machines the components of the lamp including the lamp envelope and particularly the ends of the envelope must conform to predetermined dimensions within close tolerances and must be free from such irregularities and defects which would result in the production of unsatisfactory lamps by such machines.

In the mass production of the tubular envelopes for such lamps lengths of tubing are severed from a tube drawn continuously from a glass furnace and the lengths of tubing are thereafter provided with annularly reduced end portions forming shoulders on the tubes. In the lamp making field such end portions of the tubes are designated as end collars or end collar sections. An apparatus for reshaping the ends of glass tubes to form end collars of reduced diameter thereon is disclosed and claimed in U.S. Patent No. 2,615,285.

Due to the inherent difficulties in fabricating glass parts to precise dimensions and the handling of such fabricated parts in large quantities, defects occur in a small percentage of the tubes provided with end collars. Certain of these defects make the tubes unsuitable for use in making lamps by automatic machines because the lamps when so made are commercially unacceptable and must be rejected. This increases the cost of lamp manufacture.

Such defects include irregularities in the form of nicks, projections, or waves in the annular end surface of the collar sections which surface may also be slanted with respect to the longitudinal axis of the tube; an eccentric positioning of the collar sections with respect to the adjoining part of the tube, and variations in the depth of the collar section, in the overall length of the tube including the collar sections and in the length of the tubes between the shoulders thereon formed at the collar sections.

The principal object of the present invention is to provide an automatic machine for detecting the above defects in such tubular glass envelopes for electric lamps, for separating defective envelopes from envelopes free from such defects and for separating such defective envelopes from each other according to the type of defect found therein by the apparatus. Further objects and advantages of the invention will appear from the following description of a species thereof.

In accordance with these objects the tube inspecting apparatus or machine comprises an endless chain conveyor having jaws mounted thereon for gripping the tubular envelope to be inspected by the machine, a continuous main drive for the machine, a drive mechanism connected to the main drive for indexing the chain conveyor at a plurality of inspection stations along opposite sides of the chain conveyor, inspection means mounted at said stations, and actuating means connected to the main drive of the machine for moving the inspection means into and out of engagement with the collar sections at both ends of the tubular envelopes gripped by the conveyor jaws while the conveyor is at dwell. The tube inspecting machine also comprises means controlled by the inspection means for opening the jaws of the conveyor and effect ejection from the conveyor of a tubular envelope having a defective collar section at one or both ends.

Figure 2:
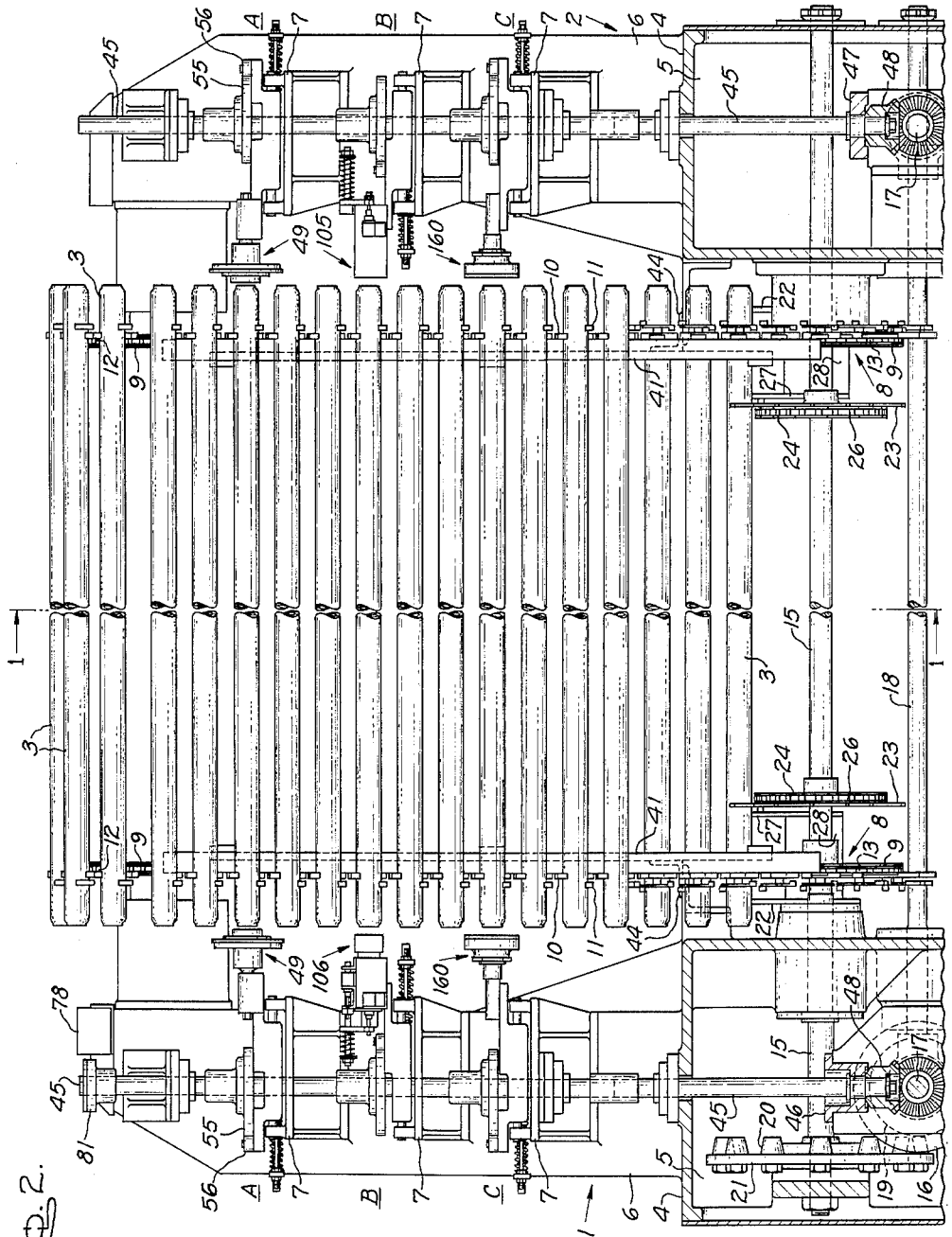

In the drawings accompanying and forming part of this specification an inspection machine embodying the invention is shown in which:

FIG. 1 is a side elevational view of the machine and a tubular envelope feeding means connected thereto, FIG. 2 is a front elevational view of the machine shown in FIG. 1, FIG. 3 is a detailed view in perspective of the indexing drive of the machine, FIG. 4 is a perspective view of a part of the conveyor chain showing the jaws mounted thereon in both an open and a closed position together with part of the mechanism for opening the jaws to release the envelopes, FIG. 5 is a top plan view of the inspection mechanism mounted at the first inspection station along the front of the machine, FIG. 6 is a side elevational view of the mechanism shown in FIG. 5, FIG. 7 is a front view of the tube engaging part of the mechanism shown in FIGS. 5 and 6, FIG. 8 is a side elevational partly sectional view, taken along the line 8—8 of FIG. 7, of the tube engaging part of the mechanism shown in FIG. 7 and a wiring diagram of the circuit for controlling the operation of the rejection means, FIG. 9 is a top plan view partly in section of the inspection mechanism mounted on the stand shown at the left of FIG. 2 and at the second inspection station along the front of the machine together with a wiring diagram of the circuit connecting the inspection mechanism with the envelope rejection means for this station, FIG. 10 is a perspective view of the mechanism shown in FIG. 9, FIG. 11 is a similar view of the inspection mechanism mounted at the second inspection station and on the stand shown at the right of FIG. 2, FIG. 12 is an elevational, partly sectional view taken along the line 12—12 of FIG. 13 showing the inspection mechanisms mounted at the third inspection station of the machine, one of these mechanisms being mounted on each of the stands shown in FIG. 2, together with a wiring diagram of the circuit connecting the mechanisms to the envelope rejection means for the third inspection station, and FIG. 13 is a front view of the envelope engaging parts of the mechanism shown in FIG. 12.

Like numbers denote like parts in all the figures.

Referring to FIGS. 1, 2 and 3 of the drawings the inspection machine comprises two spaced stands 1 and 2 mounted in opposing positions on a main base (not shown) and supporting the various mechanisms of the machine described below. The stands 1 and 2 may be and preferably are adjustable relative to each other in a horizontal direction on the main base member to change the spacing between the stands so that the machine may be used for inspecting the collar sections of tubular lamp envelopes 3 of various lengths. The stands 1 and 2 are similar in structure and similar parts thereof are designated by the same numeral in the drawings. Each stand has a hollow base 4 providing a gear box as housing 5. An upwardly extending rigid plate member 6 is mounted on the base 4 and a plurality of vertically spaced apart horizontal platforms 7 for supporting the collar inspection mechanisms of the machine are affixed to the plate 6.

The conveyor 8 for the tubular envelopes 3 is mounted on the stands 1 and 2 as described below. The conveyor is made up of a pair of endless chains 9 each having a series of tube gripping pairs of jaws 10 and 11 mounted thereon with the pairs of jaws on the respective chains 9 aligned in a horizontal direction so as to support in a horizontal position between the stands 1 and 2 the tubular envelopes 3 gripped by the jaws 10 and 11 and carried by the conveyor 8.

Each of the chains 9 is trained over sprockets 12 and 13 spaced apart vertically on the stands 1 and 2 so that the conveyor has a back reach or run and a front reach. The tubular envelopes 3 are fed into the aligned pairs of jaws 10 and 11 on the conveyor 8 at the lower part of the back reach of the conveyor by the feeder mechanism 14 (FIG. 1) described below. The tubular envelopes 3, hereinafter called tubes for convenience, are carried by the conveyor 8 to the inspection stations, designated as A, B and C on the drawings, disposed along the front reach of the conveyor in vertically spaced relation and opposite the ends of the conveyed tubes 3. The tubes are released from the pairs of jaws 10 and 11 on the conveyor at various locations along its front reach after inspection by the mechanisms at one or all of the inspection stations A, B and C and as described below.

The conveyor 8 is moved intermittently a sufficient distance to present the conveyed tubes 3 in succession to each of the inspection stations and is at dwell between each movement for a sufficient time to permit the inspection mechanism at each station to complete its cycle of operation.

The drive for so moving the conveyor 8 comprises the lower sprockets 13 which are affixed to a common shaft 15 journalled into both bases 4 of the stands 1 and 2. The drive for the shaft 15 to accomplish the indexing of the conveyor 8 may be driven from the main drive means by any conventional indexing mechanism, such as the mechanism shown in FIGS. 2 and 3 which comprises a rotating cam 16 affixed to the shaft 17 in the base 4 of the stands which shaft is connected to the main drive 18 of the machine and is continuously rotated thereby. The cam 16 has a cam track 19 (FIG. 3) which engages the rollers 20 mounted around the periphery of a circular plate 21 fastened to the shaft 15 on which the lower sprockets 13 are fixed. Indexing mechanisms of this kind are well known in the art and a species thereof is described in U.S. Patent No. 1,742,153—Stiles et al. The shape of the cam track 19 is such that on each complete revolution thereof the conveyor 8 is moved a sufficient distance to carry the tubes 3 in succession to the inspection stations A, B and C and is held stationary after each movement for a time sufficient for the inspection mechanisms at each of the stations to complete a cycle of operation. The idler sprockets 12 for the conveyor chains 9 are journalled to the top of the stands 1 and 2, as shown in FIG. 2.

The tubes 3 are fed to the conveyor 8 of the machine by the feeder assembly 14 which is made up of the rails 22 fastened to the bases 4 and spaced apart so as to engage and support the tubes 3 at the end portions of the tubes. The rails 22 slope gently downward toward the conveyor 8 so that the tubes 3 tend to roll along the rails by gravity in the direction of the conveyor. The tubes are restrained from rolling freely down the rails and are brought to the conveyor in properly timed relation to be picked up by the jaws 10 on the conveyor chains 9 by the spacing lugs 23 mounted on the chains 24 of the feeder assembly 14. The chains 24 are entrained over the sprockets 25 and 26 located at opposite ends of the rails 22. The driving sprockets 26 for the chains 24 are affixed to the common shaft 15 to which the drive sprockets 13 of the conveyor 8 are affixed. The feeder chains 24 thus are driven with the same intermittent motion as the conveyor 8 and the movements of the conveyor and the feeder assembly are properly synchronized to effect a transfer of the tubes 3 from the feeder assembly 14 to the jaws 10 and 11 on the conveyor 8 during operation of the machine. The idler sprockets 25 for the chains 24 are mounted on the rails 22. The upper reach of the chains 24 are supported by the guides 27 attached to the rails 22 by brackets 28.

The jaws 10 and 11 of the conveyor 8 are in an open position with respect to each other to receive the tubes 3 from the feeder assembly 14 and are moved to a closed position around the tubes after the tubes have been received therebetween.

The structure of the jaws 10 and 11 and the manner in which the jaws are attached to the chains 9 is shown in FIG. 4 of the drawings in which a series of four pairs of jaws is shown in the relative positions thereof on the downward reach of the conveyor 8. It will be noted that on this downward reach of the conveyor 8 the fixed jaw 10 is uppermost and that the movable jaw 11 is lowermost in each of the pairs of jaws. Of course, on the upward reach of the conveyor 8 the relative positions of the jaws 10 and 11 are reversed so that the tubes 3 as they are delivered by the feeder assembly 14 are supported by the fixed jaws 10 which are in the lowermost position on this reach of the conveyor 8. The movable jaws 11 are in an open position when the jaws are in a tube receiving position with respect to the feeding assembly 14.

As shown in FIG. 4, the fixed jaws 10 are attached directly to the flanges 30 of the exposed links of the conveyor chains 9. The movable jaws 11 are each mounted on a pivot pin 31 affixed to the respective jaw 10 and at a part thereof opposite the exposed link of the conveyor chain 9. Each jaw 11 is provided with a roller 32 mounted thereon beyond the pivot pin 31 in the direction away from the tube engaging part of the jaw 11. The tube engaging part of the movable jaw 11 is urged toward a closed position with respect to the jaw 10 by the spring 33 coiled around the pivot pin 31 with its opposite ends 34 and 35 engaging the fixed jaw 10 and the movable jaw 11 on opposite sides of the pivot pin 31 as shown in FIG. 4. The spring 33 is strong enough to exert sufficient force on a tube 3 between the jaws 10 and 11 to firmly hold the tube therebetween as the latter is carried along by the conveyor 8. A stop 37 is provided on the fixed jaw 10 for limiting the movement of the movable jaw 11 when a tube 3 is not in position between the jaws.

As shown in FIG. 1, a cam 38 is mounted along the path of the rollers 32 on the movable jaw 11 to move the latter from a closed to an open position when the jaws are brought into a tube pick-up position with respect to the feeder mechanism 14. The movable jaw is released to return to its closed position as the roller thereon is carried beyond the cam 38. A similar cam 39 is provided to move the jaw 11 to an open position in the same manner to release the tube at the unload part of the machine.

As shown in FIGS. 1, 2 and 4, the conveyor chains 9 run along channels 40 provided in vertical guides 41 extending along the upward and downward reaches of the conveyor 8. The guides 41 are attached to each other and to supports 42 by braces 43. The supports 42 are fastened to the stands 1 and 2 by brackets 44. The guides 41 prevent any random lateral movement of the conveyor 8 which is particularly important on the downward reach of the conveyor whereat the inspection mechanisms are brought into engagement with the end sections of the tubes 3.

The common drive for the inspection mechanisms mounted at the inspection stations A, B and C is shown in FIGS. 1, 2, 5 and 6 of the drawings and comprises two vertical cam shafts 45 journaled in bearings 46 and 47 mounted on the stands 1 and 2 continuously rotated in opposite directions through the main drive shaft 18 of the machine to which shaft they are connected by the shafts 17 and the bevel gear sets 49 as shown in FIGS. 1 and 2. The drives for the cam shafts 45 are so arranged relative to the indexing drive for the conveyor 8 that the shafts 45 make one complete revolution for each movement of the conveyor 8. The rotation of the shafts 45 is effected through the means described below for moving the inspection mechanisms from a tube disengaging to a tube engaging position and back again while the tubes 3 on the conveyor 8 are stationary, that is, while the conveyor 8 is at dwell.

The inspection mechanism at the first station A comprises gauging means 49 described hereinafter for testing the concentricity of the collar sections with the adjacent parts of the ends of the tubes, the inspection mechanism at the succeeding station B gauges the length of the collar sections at each end of the tubes, the overall length of the tube including the collar sections and the length of the tubes between the collar sections, and the inspection mechanisms at the third station C gauge the ends of the tubes for irregularities. Each of the mechanisms at the respective stations are described in detail hereinafter.

Since the means for supporting the inspecting mechanisms, the means for actuating the mechanisms and the means for rejecting tubes found to be defective by the inspection mechanisms at stations A, B and C are of similar structure, the supporting, actuating and rejection means on stand 1 at station A will be described in connection with FIGS. 1, 2, 4, 5 and 6 of the drawings. It will be understood that those components on stand 2 at station A and on stands 1 and 2 at stations B and C are of the same structure, except as mentioned below.

The support for the gauging means 49 on stand 1 and at station A is made up of the horizontal platform 7 affixed to the stand 1. A pair of parallel rods 50 and 51 (FIGS. 5 and 6) is supported in horizontal position by brackets 52 and 53 affixed to the platform 7 and a carriage 54 is slidably mounted for reciprocation on the spaced rods in a longitudinal direction with respect to the tubes 3 carried by the conveyor 8. The carriage 54 is reciprocated on the rods 50 and 51 by the disc cam 55, affixed to the shaft 45 so as to rotate therewith and which is engaged by the cam follower constituted by the roller 56 mounted on the carriage 54. The roller 56 is urged against the rim of cam 55 by the spring 57 compressed between the carriage 54 and an arm 58 affixed to bracket 52 by bolts 59. The spring 57 extends through an opening in the bracket 52.

The cam track on the disc cam 55 is shaped in such manner and the shaft 45 is rotated in the direction such that the gauge 49 mounted on the carriage 54 is advanced toward the ends of the tube 3 supported opposite the tube engaging parts of the gauge by the conveyor 8 slowly enough to avoid damage to the fragile glass tube end section when it is engaged by the parts of the gauging mechanism.

The cam track on cam 55 is shaped to quickly withdraw from contact with the tube 3 the aforesaid parts of the gauge to minimize the necessary dwell period of the conveyor 8. The gauge 49 is held in a withdrawn position by the actuating mechanism described above while the conveyor is moving a succeeding tube 3 into a position to be inspected by the inspection mechanism mounted at this station. The above operation of the carriage is repeated each time the conveyor 8 is at dwell so that the gauge 49 is moved into and out of engagement with an end of each tube 3 on the conveyor during operation of the machine. An identical gauge 49 is mounted on the stand 2 at station A and is supported and moved into and out of engagement with the other end of each of the conveyed tubes 3 in the same manner and at the same time.

It will be noted from FIG. 2 of the drawings that the gauges at stations A and C are pulled away from the conveyor by the cams 55 acting against the force of the springs 57 and that the gauges at station B are driven toward the conveyor by the cams 55 acting against the force of the springs 57 at this station.

In the event that either end of a conveyed tube 3 is found to be defective by the gauges 49 at station A, the tube is rejected by being released from between the pairs of jaws 10 and 11 on each of the conveyor chains 9 before it is carried to station B. The defective tube released from the conveyor travels by gravity down inclined rails 60 away from the conveyor 8 and out of the machine before it is carried to the next inspection station B.

The tube rejection means at station A includes an electrical relay system 61 (FIG. 8) connected to the gauges 49 in such manner that a pair of solenoids 62 are energized when either of the gauges 49 detect a defect in the ends of a conveyed tube 3 to effect opening of both pairs of jaws 10 and 11 gripping the defective tube. To this end the armature 63 of each of the solenoids 62 is mechanically linked by a bell crank lever 64 and a connecting rod 65 to a cam 66 pivoted on a stationary arm 67 so as to be movable into and out of the path of the roller 32 mounted on the movable jaw 11 (FIGS. 1 and 4). In FIG. 1 the pivoted cam 66 is shown out of the path of the rollers 32 and in FIG. 4 in the path of a roller 32. The stationary arm 67 is integral with the housing of the solenoid 62 which housing is affixed to the support 42.

In FIG. 1 of the drawings only one of the solenoids 62 and the mechanical linkage thereof to a cam 66 for opening one of the two pairs of jaws gripping a single tube has been shown for each of the stations A, B and C but it will be understood that duplicates of these components are provided at each station for opening the other pair of jaws gripping the tube to be rejected and that the operation is the same. When the solenoids 62 for the two pairs of jaws are energized, the armatures 63 are moved upward and the cams 66 are moved into the path of the rollers 32 (FIG. 4) as a defective tube 3 is carried downward so that the movable jaws 11 are opened with respect to the fixed jaws 10 of each pair of jaws to release the defective tube as described below.

Each cam 66 when moved into the path of a roller 32 as described above is locked in this position by a latch 68 (FIG. 4) pivoted on the arm 67. The latch 68 rotates on its pivotal axis as the cam 66 is rotated on its pivotal axis into the path of the roller 32, the latch 68 being urged against the cam 66 by the spring 69 affixed to the support and to the rod 70 affixed to the latch 68. The latch 68 thus prevents the cam from turning on its pivotal axis as the roller travels along its operative face of the cam. Thus, only momentary energization of the solenoid 62 is necessary for releasing a tube from between the jaws 10 and 11.

After the tube has fallen from between the open jaws 10 and 11 as described above, the cam 66 is unlocked and is swung back to its retracted position with respect to the path of the rollers 32 under the weight of the armature 63 of the solenoid when the latch 68 is released. The release of the latch 68 is accomplished by the cam-shaped projection 71 on the fixed jaw 10 which projection engages the rod 70 and swings the latch around its pivotal axis against the force of the spring 69 to unlock the cam 66. The latch 68 is held in its released position against the force of the spring 69 by the cam 66 as shown in FIG. 1. The cam 66 remains in its retracted position until the armature 63 of the solenoid 62 is again lifted upon detection of a defective tube end by the gauges 49 which actuate the relay system 61 controlling the operration of the solenoids 62.

The relay system 61 for the two solenoids 62 at station A is schematically illustrated in FIG. 8.

Both solenoids 62 are connected in parallel for energization from a voltage source, such as a 110 volt line, connected across the terminals 72. The coils of the solenoids 62 are included in a circuit including the conductors 73 and contact 74 of the relay 75. The coil 75' of the relay 75 is connected by conductors 76 and 76' across the secondary of a step down transformer 77 the primary of which is connected across the line terminals 72. The switch 78 of the timing means described below is connected into one of the leads 76'. The relay coil 75' is in a parallel circuit including conductors 76 and normally open contacts 79 and 80 on both gauges 49 at station A. Thus, when the contacts 79 and 80 on either or both of the gauges 49 are closed the parallel circuit including the relay coil 75' is made and has continuity so that on energization of the circuit by closure of the switch 78 the relay 75 closes the contacts 74 to energize the solenoids 62.

The operation of the switch 78 is controlled by a cam 81 fastened to the shaft 45 on stand 1 (FIG. 2) of the machine in such manner that it makes one complete revolution during each indexing operation of the conveyor. Cam 81 has a narrow raised portion 82 which is effective on rotation of the cam for moving the arm 83 of the switch 78 from a normally open to a closed circuit position.

In operation, the cam 81 closes momentarily the normally open snap action switch 78 while both gauges 49 at station A are in engagement with the ends of a single conveyed tube 3. If the ends of the tube are free from the defects which the gauges are adapted to detect, the gauge contacts 79 and 80 remain open so that the armatures 63 of the solenoids 62 remain in their normally lowered position (FIG. 1) and the cams 66 remain in their retracted positions with respect to the rollers 32 on the lower jaws 11 gripping the conveyed tube. If one or both of the gauges 49 detect a defect in the ends of the tube, the continuity of the circuit including the conductors 76 and the relay coil 75' is established by closing of either or both of the pairs of contacts 79 and 80 on the gauges 49 and on momentary closing of the switch 78 by the cam 81, as described above, the solenoids 62 are energized and move the cams 66 into the path of the rollers 32 on the jaws 11 gripping the tube 3 with defective ends. The cams 66 are locked in this position by the latches 68 and on the next indexing movement of the conveyor 8 are engaged by the rollers 32 on the jaws 11 gripping the defective tube. The jaws 11 thus are opened to allow the defective tube to fall by gravity out of the conveyor before the next inspection station is reached. On the next indexing movement of the conveyors the jaws 11 are again closed by release of the latch 68 as described above and remain closed until opened by the cams 38 and 39, also as described above.

Of course, if no defects are detected by the gauges 49 in the end or collar sections of the tube the contacts 79 and 80 on both gauges remain in an open circuit position and the jaws 11 on the conveyor remain closed so that the tube found free from defects which the gauges 49 are adapted to detect is carried to the next inspection station.

The concentricity gauge mechanisms 49 are of the same structure and each comprises a centering cone 83, which is in the nature of a plug gauge, backed by a spring 84 which biases the member 83 outward with respect to the housing 85 for the member 83 and the spring 84. The cone member 83 is telescoped within the housing for movement longitudinally thereof during the gauging of the tube 3. The housing 85 is attached to the carriage 54 by the support members 86 and 87 which are electrically insulated from each other as shown at 88. Support member 87 is bolted to the carriage 54 as shown at 89 and support member 86 is in the form of a bolt secured to the hollow support member 87, as shown in FIG. 6. The spring 84 is located around the end of the support bolt 86 within the housing 85 and the latter is welded to the bolt 86 as shown in FIG. 8.

When the gauge 49 is moved into engagement with the collar section 90 of a conveyed tube 3 by the mechanisms described above, the centering cone 83 enters and engages the end of the collar section to center this end with respect to the housing 85.

The concentricity of the collar section 90 of the tube engaged by the centering cone 83 with the main body portion 91 of the tube 3 is tested by the floating ring contact 92, which is in the nature of a receiving gauge, mounted around the cone member 83 and on the housing 85 in such manner, described below, that the ring 92 is movable laterally with respect to the centering cone member 83. The contact ring is provided with a plurality of rigid fingers 93 extending outwardly of the gauge 49 for engaging a tube 3 at the part thereof where the collar section 90 merges with the main tubular part 91 of the tube 3 being gauged. Thus, as the gauge 49 is brought into engagement with the end of a conveyed tube 3 the centering cone and the floating ring are concentric with each other when the collar section 90 of the tube 3 is concentric with the main body portion 91 of the tube 3. The floating ring is constructed and arranged with respect to the electrical contacts on the gauge, described below, that when a tube 3 having concentric collar sections 90 is inspected the gauge contacts remain in an open circuit position and the jaws on the conveyor remain closed so that the tube remains on the conveyor to be carried to the succeeding inspection station.

If the collar sections 90 of a gauged tube 3 are eccentric with respect to the body portion 91 of the tube 3, the floating ring 92 is shifted laterally with respect to the cone member 83 and when so shifted is brought into engagement with electrical contact members, described below, of the gauge to establish continuity in the electrical circuit including the gauge contacts 79 and 80 and the defective tube 3 is ejected from the conveyor by the mechanism described above.

The floating contact ring 92 is supported on the housing 85 by a retainer ring 94 bolted, as shown at 95, to the housing 85. Spaced ears or lugs 96 are provided on the housing 85 which are engaged by the bolts 95. The contact ring 92 is held between the retainer ring 94 and the end of housing 85 in such manner that it is movable laterally but not longitudinally of the housing.

A fixed support ring 97 is also secured to the housing 85 by the retainer ring 94 and the bolts 95. The ring 97 supports a contact supporting ring 98 on which is mounted a plurality of radially arranged contact members 99 which are adjustable with respect to the outer periphery of the floating contact ring 92. The inner ends of the contact members 99 are juxtaposed to but normally spaced from the contact ring 92, the spacing being adjusted according to the tolerances predetermined for the collar sections 90 of the gauged tubes 3. The contact members 99 are each in electrical engagement with their supporting ring 98. The rings 97 and 98 are fastened together in spaced and electrically insulated relationship by a plurality of bolts 100 which are electrically insulated, as shown at 101, from the ring 98 and clamp the latter to the ring 97. An electrical terminal member 102 is secured to one of the bolts 100. The terminal member 102 and the gauge parts including bolt 100 to which the terminal 102 is secured, the ring 97, retainer ring 94 and the floating ring 92 constitute the contact 80 of the gauge described above.

A similar terminal member 103 is bolted to the ring 98, as shown at 104 in FIG. 7, and constitutes with the ring 98 and the adjustable contacts 99 supported thereby the contact 79 of the gauge mentioned above.

The floating contact ring 92 is shifted laterally into engagement with the inner end of one or more of the adjustable contacts 99 when a tube 3 having a collar section 90 the eccentricity of which with respect to the body portion 91 of a tube 3 is outside the tolerances for which the gauge is set. When this occurs, the defective tube is released from the conveyor in the manner described above.

The gauges 105 and 106 mounted at the second inspection station B of the machine and shown in FIGS. 9 and 10 and FIG. 11, respectively, are slightly different in structure from each other and are arranged to inspect the length of the tubes 3 presented at station B between the base lines 107 on the collar sections at opposite ends of the tube and the length of the collar sections themselves between the base line and the outer end of the collar section at each end of the tube. The base line 107 is the circumferential line whereat the rim of the usual base shell engages the collar section of the tube when the base is mounted on the end of the tube 3. The base line is indicated by the broken line in FIG. 9 to indicate its location.

The parts of the gauge mechanism 105 and 106 which inspect the length of the tubes 3 between the base lines 107 at opposite ends of the tube 3 first is described below together with the electrical circuit associated with these parts for actuating the tube reject mechanism controlled by this electrical circuit. Then is described the parts of the respective gauge mechanisms which measure the length of the collar sections at opposite ends of the tube together with the associated elecrical circuit for controlling the operation of the tube reject mechanism at this station B.

Referring to FIG. 11 of the drawings the gauge mechanism 105 shown in this figure is also shown mounted at station B and on the stand 2 at the right of FIG. 2 and comprises a hollow gauge block 108 affixed to the carriage 54 so as to be movable therewith. The carriage is moved as described above in connection with the gauge mechanisms at the first inspection station A to bring the gauge block 108 into engagement with one end of the tube 3 to be inspected at the second station B.

The gauge block 108 is in the nature of a receiving gauge block in that the front wall thereof is provided with a circular opening 109 to accommodate a collar section 90 of the tube 3 to be inspected. This is shown in FIG. 9 in connection with the similar gauge block 110 of the gauge mechanism 106 mounted on the stand 1 as shown in FIG. 2 and described in detail below. The diameter of the opening 109 in both gauge blocks 108 and 110 with respect to the diameter of the tube 3 to be inspected is such that the sides of the tube receiving openings 109 in the gauge blocks engage the collar sections 90 at the ends of the tube in a line contact corresponding to the base lines 107 which are engaged by the rims of the cup-shaped bases cemented to the collar sections of the tube in the subsequent manufacture of lamps incorporating such tubes.

The receiving gauge block 108 of the mechanism 105 shown in FIG. 11 establishes a reference on one collar 90 of the tube 3 from which measurements are made by other parts of the inspection gauges 105 and 106. Thus, in measuring the collar to collar length of the tube or, more specifically, the distance between the base lines 107 at opposite ends of the tube, the receiving gauge blocks 108 and 110 are brought into contact with the collar sections 90 at the ends of the tube by the carriages 54 as described above and the length thereof is inspected by the gauge block 108 affixed to the carriage 54 and the gauge block 110 movably mounted on the mechanism 106 shown in FIGS. 9 and 10, all as described below.

The movable gauge block 110 of FIGS. 9 and 10 is mounted on a hollow spindle 111 which is longitudinally movable in a mounting block 112 affixed by bolts to the carriage 54 and which spindle 111 may be moved back into the mounting block 112 against the force of a spring 113 engaging shoulders on the block 112 and the spindle 111 and which urges the spindle 111 and therewith the gauge block 110 outward of the mouting block 112 and against the collar section 90 at this end of the tube 3 as shown in FIG. 10, when the gauge mechanism 106 is moved into engagement with the end of tube 3.

The hollow spindle 111 extends through the mounting block and at its threaded end opposite the end thereof supporting the receiving block 110 has affixed thereto by nut 111' a transverse switch actuating arm 114 which supports two adjustable screws 115 and 116. The screws 115 and 116 are mounted in such position on the arm 114 that they engage the lever arms 117 and 118 of the snap action switches 119 and 120 mounted on the channel bar 121 affixed to the mounting block 112.

The stationary switches 119 and 120 and the adjustable screws 115 and 116 are so arranged that if the distance between the collar sections 90 of a tube 3, or more specifically the distance between the base lines 107 at opposite ends of a tube 3, is outside the predetermined limits, at least one of the switches 119 or 120 is in a closed position. If either switch 119 or 120 is in its closed position when the gauge mechanism has been moved to its gauging position with respect to the tube 3, the circuit including the relay 75 of the tube rejecting means for this second station B of the machine has continuity so that on energization of this circuit by the closing of switch 78 of the cam 81 attached to the shaft 45 of the machine the tube 3 having base lines separated a distance outside the predetermined limits will be rejected as described above in connection with the reject mechanism for the first inspection station A.

If the distance between the base lines 107 is within the predetermined limits, the parts of the gauging mechanism described above are so arranged that the switches 119 and 120 are both in an open circuit position and the circuit including the relay 75 does not have continuity and the tube 2 being gauged therefore is not rejected but is carried to the next inspection station C by the conveyor provided the length of both collar sections 90 of the tube 3, which collar sections are measured by other parts of the gauge mechanisms 105 and 106 as described below, is also found to be within the predetermined limits therefor.

Accordingly, one of the switches, for example switch 119, is in a closed position and the other switch, for example switch 120, is in an open position when the gauge block is in its fully extended position with respect to the support block 112. The lever arms 117 and 118 of switches 119 and 120, which arms are spring biased toward and against the set screws 115 and 116, respectively, are in their depressed positions when the gauge block 110 is in its extended position.

The gauge mechanisms 105 and 106 are moved simultaneously into engagement with the ends of a tube 3 by movements of the carriages 54 in the manner described in connection with the gauge mechanisms at station A, the gauge blocks 108 and 110 are brought into engagement with the collar sections 90 at the ends of the tube and contact the collar sections at the base lines 107 thereon. The gauge block 108 being affixed to its carriage 54 establishes the fixed position of the tube 3 while the latter is being inspected by the gauge mechanisms 105 and 106. The gauge block 110 mounted for movement in the support block 112 affixed to its carriage 54, after engaging the tube 3 at the base line thus is held stationary by the tube 3 engaged by both gauge blocks 108 and 110 while the support block and therewith the switches 119 and 120 continue to be carried toward their limit of travel in the direction of the tube 3. The arms 117 and 118 of the switches continue to press against and engage the set screws 115 and 116, respectively, as the relative movement between the gauge block 110 and the support block 112 increases the distance between the switches 119 and 120 on the one hand and the switch arm 114 on the other hand.

If a tube 3 being inspected by the gauge mechanisms is shorter between the base lines 107 than the minimum predetermined length the switch 119 remains in a closed position. When an inspected tube is longer between the base lines 107 than the maximum predetermined length, the switch 120 snaps into a closed position from its open position. When the distance between the base lines 107 of an inspected tube is within the predetermined limits, both switches 119 and 120 are in an open position. The switches 119 and 120 are included in the parallel circuit shown diagrammatically in FIG. 9 which also includes the conductors 76 and the coil 75' of the relay 75 of the tube rejection mechanism at this station B. The relay 75 is connected by conductors 76' across the secondary of transformer 77 (FIG. 8) when switch 78 is closed. Thus, as described above in connection with station A if either of the switches 119 or 120 are in a closed circuit position when the relative positions of the gauge block 110 and the support block 112, determined by the distance between the base lines 107 of the tube, is such as to cause one of the switches 119 or 120 to be in its contact making position the tube is rejected as described in connection with the gauge mechanisms at station A. Of course, when the distance between the base lines 107 of the inspected tube 3 is within the predetermined limits, both switches 119 and 120 are in an open position and the circuit including the relay 75 lacks continuity so that the solenoids 62 are not energized on closing of the switch 78 and the tube is not rejected.

Turning now to the parts of the gauge mechanisms 105 and 106 for measuring the depth of the collar sections 90 at each end of the inspected tube, that is, the distance between the base lines 107 and the respective terminations of the tube adjacent these base lines, these parts of the gauge mechanisms 105 and 106 act in cooperation with the gauge blocks 108 and 110, respectively, as described below.

The collar measuring parts of the gauge mechanisms 105 and 106 include discs 125 and 126 which butt against the terminations of the tube 3 being inspected while the gauge blocks 108 and 110 are in effective contact with the tube collar sections 90, as shown in FIG. 9. The disc 126 of the gauge mechanism 106 shown in FIGS. 9 and 10 is mounted on the rod 127 which extends through the hollow spindle 111 supporting gauge block 110 and is reciprocable longitudinally therein. The rod 127 is biased toward the open end of gauge block 110 by the coiled spring 128 which presses against shoulders on the hollow spindle and the rod 127, as shown in FIG. 9.

The switch actuating arm 129 is affixed by nut 130 to the threaded end 131 of the rod 127 extending beyond the hollow spindle 111. The set screws 132 and 133 are mounted on the arm 129 and engage the lever arms 134 and 135 of the switches 136 and 137 affixed to the switch actuating arm 114 attached to the hollow spindle 111. The arrangement of the switches 136 and 137 with respect to the other parts of the gauge mechanism is such, as described below, that one of the switches, for example switch 136, is in a closed circuit position to make the circuit of the tube reject means if the collar section at this end of the tube is too short and the other switch, for example switch 137, is in a closed circuit position and makes the circuit if the collar section is too long. Both switches are in an open circuit position when the length of the collar section is within the predetermined limits. In the latter case the tube is not rejected by operation of the switches 136 and 137.

In order to align the adjustable set screws 132, 133 and 115, 116 with the switch lever arms 134, 135 and 117, 118 respectively and to maintain this alignment during movements of the arms 129 and 114, a guide rod 140 is provided for the arms 129 and 114 on which the set screws are mounted. The guide rod is pinned to the arm 114 as shown at 141 so as to be movable therewith and extends in one direction through openings in bracket 121 and in the bracket 142 affixed to the support block 112. The guide rod makes a slip fit with the sides of the openings in the spaced brackets 121 and 142 and is movable therein only in a longitudinal direction.

The guide rod 140 also extends from the arm 114 through an opening in arm 129 and moves a slip fit with the sides of the opening. Thus, relative rotation on the one hand between the hollow spindle 111 and the rod 127 supporting disc 126 and on the other hand between spindle 111 and the support block 112 is prevented by the guide rod 140 to maintain the alignment of the set screws and the switch arms during use of the gauge mechanism 106.

A coiled spring 145 is mounted on the part of rod 140 between the brackets 121 and 142 and is compressed between the bracket 121 and a collar 146 affixed to the rod by the pin 147. The spring 145 augments the force exerted by spring 113 urging the gauge block 110 against an engaged tube 3 and, being on the outside of the supporting block 112, may be replaced easily by a stronger or weaker spring, or may be adjusted or omitted to change the said force as required. A similar coiled spring 148 is mounted on the end portion of rod 140 extending beyond the arm 129 in the direction away from arm 114 and is compressed between the arm 129 and collar 149 back by nut 150 threaded on the end 151 of rod 140. This spring 148 augments the force exerted by spring 128 on the rod 127 carrying disc 126, as required.

The switches 136 and 137 are connected into the circuit including the conductors 76 and the relay coil 75' in parallel with the switches 119 and 120.

The gauge mechanism 105 shown in FIG. 11 inspects the length of the collar section 90 at the opposite end of the tube 3 and is similar in operation and in structure to the collar inspection parts of gauge 106, described above. Thus, the switch actuating arm 152 for switches 153 and 154 is mounted on a rod (not shown) supporting disc 125 and which corresponds to rod 127 of the mechanism 106 shown in FIGS. 9 and 10 and is spring biased toward the opening 109 in gauge block 108 like the rod 127 is spring biased in the hollow spindle 111 of the gauge block 110. The gauge block 108 of this mechanism 105 is affixed to carriage 54, as mentioned above. The switch arm 152 has thereon adjustable set screws corresponding to the set screws 132 and 133 and the switches 153 and 154 have lever arms corresponding to the lever arms 134 and 135 of the switches 136 and 137 of the gauge mechanism 106 of FIGS. 9 and 10. The switches 153 and 154 are attached to the gauge block 108, by brackets 156 as shown in FIG. 11, which block 108 also serves as the support block in the gauge mechanism 105. The guide rod 140 corresponding to the guide rod 140 of FIGS. 9 and 10 is affixed to the gauge block 108 by the bracket 157 and the spring 148 on the rod 140 serves the same purpose in this mechanism 105 as the corresponding spring 148 in the mechanism 106.

The switches 153 and 154 are connected in parallel by conductors 76 (FIG. 9) with the switches 119, 120, 136 and 137 and are arranged to operate in the manner described above in connection with corresponding switches 136 and 137. That is, when the length of the tube collar section 90 gauged by the mechanism 105 is within the predetermined limits both switches 153 and 154 are in an open circuit position and when the length of collar section is either too short or too long one of the switches is in a circuit making position.

During operation of the inspection apparatus as described above the gauge mechanisms 105 and 106 are moved into engagement with the tube 3 with the gauge blocks 108 and 110 in contact with the tube collar sections 90 and the discs 125 and 126 in contact with tube terminations. If the distances between the base lines 107 at opposite ends of the tube on the one hand and between the base lines 107 and the adjacent terminations of the tube on the other hand are within the predetermined limits for which the adjustable set screws, the switches and the other parts of the gauge mechanisms 105 and 106 have been preset, all six switches are in an open circuit position and the tube is not rejected. If any of these distances are outside the predetermined limits at least one of the six switches will be in a closed circuit position and the tube will be rejected in the manner described above.

The inspection mechanisms 160 mounted at the third inspection station C of the machine inspect the terminations of the conveyed tubes 3 for nicks, notches, protuberances or slants, that is, these mechanisms 160 are adapted to detect any deviations of the tube terminations or rims from an annular surface in a plane normal to the longitudinal axis of the tube.

Since these gauge mechanisms 160, like the concentricity gauges 49 at the first inspection station A, are of identical structure only the mechanism shown on stand 1 at the left of FIG. 2 and FIGS. 12 and 13 of the drawings will be described in detail below.

The gauge mechanisms 160 are mounted on the carriages 54 (not shown) by support posts 86 and are moved into and out of engagement with the rims 161 of the tubes 3 presented at the third inspection station C in the same manner that the gauge mechanisms 49 at the first inspection station A are attached to the carriages 54 by support posts 86 and moved into and out of engagement with the tube ends. Further, the electrical circuit means at station C is the same as at station A for actuating the tube reject mechanism.

The parts of the mechanism 160 shown in FIGS. 12 and 13 include housing made up of a central support body 162 attached to the post 86, a ring-shaped housing part 163 screw threaded onto the support part 162 and an annular cover plate 164 bolted as shown at 165 to the flange 166 on the ring-shaped housing part 163. The cover plate 164 and the bolts 165 are electrically insulated from the other parts of the housing as shown at 167 and 167' and the housing part 163 is locked in position by nut 168. The central part 162 of the housing is provided with ducts 169 which are connected, as shown in FIG. 12, to a conduit 170 which in turn is connected to a source (not shown) of air under pressure. Air flowing under pressure through the conduit 170 and the ducts 169 clears away from the rim 161 of the tube 3 to be inspected any foreign material on the tube rim 161 which would interfere with the proper inspection thereof by the gauge mechanism 160.

A plate-like disc 171 having a plurality of slots 172 at its periphery is bolted as shown at 173 to the center part 162 of the housing. The slots 173 extend in an axial direction of the disc and accommodate and guide the free ends of the resilient feeler wires 174, the opposite ends of which are affixed, as by being embedded, to a holding ring 175. The holding ring 175 is mounted concentric with the disc 171 and is supported within the housing part 163 by the flange 166 of the housing part and the cover plate 164 which latter is insulated from the ring and the flanged housing 163 by the insulating disc 167. The tube end engaging parts of the feeler wires 174 are supported by the ring 175 in a common plane, in angularly spaced positions with respect to each other in said plane and radially with respect to the center of the disc 171 which is in the longitudinal axis of the housing. The disc 171 is of smaller diameter than the diameter of the opening defined by the rim 161 of the tube 3 so that the feelers 174 engage the said rim when the gauge mechanism is in its furthest advanced position with respect to the tube 3.

A contact ring 176 is threaded onto the inner periphery of the cover plate 164 of the housing, is re-entrant slightly into the housing and has an opening of larger diameter than the opening defined by the tube rim 161 so that the feelers 174 are accessible therethrough for engagement with rim 161.

When the gauge mechanism 160 is in its withdrawn position with respect to the end of the tube 3, the feelers 174 are in contact with and press against the re-entrant part of the contact ring 176 which serves as a stop member for the feelers. The circuit which includes the gauge contacts 79 and 80 thus has continuity. If the rim 161 of the tube 3 is free from the imperfections noted above, all of the feelers 174 are forced away from the re-entrant part of ring 176 when the gauge mechanism 160 is in its fully advanced position with respect to the tube 3 with the longitudinal axes of the housing and the tube in alignment and the circuit including the gauge contacts or terminals 79 or 80 will lack continuity. Thus, the tube reject mechanism associated with the gauge mechanism 160 is not actuated and the tube is not rejected thereby, all as described in connection with the gauge mechanisms and the electrical circuits and reject mechanisms at station A.

If one or more of the feeler wires 174 remains in contact with the re-entrant part of the contact ring 176, when the irregularity gauge 160 is in its furtherest advanced position the circuit including conductors 76 and relay coil 75' and controlling the operation of the tube reject means has continuity and the tube is rejected also as described above in connection with the various parts of the apparatus at station A. The imperfections in the rim 161 which the gauge mechanism 160 detects includes notches in the rim and the rim itself being slanted with respect to the longitudinal axis of the tube 3. Such imperfections in the configuration of the rim 161 will allow one or more of the feelers to remain in contact with the ring 176.

The gauges at station C are useful, of course, for detecting such imperfections in the ends, rims or terminations of open ended tubes whether or not such tubes have end collar sections.

The contacts or terminals 79 and 80 of the other gauge mechanism 160 mounted on the stand 2 at station C are connected into the control circuit by conductors 76 (FIG. 12) as described above in connection with the gauges at station A and the said circuit is only momentarily energized by closing of switch 78 by the cam 81 attached to the shaft 45 of the machine, all as described above.

As shown in FIGS. 8, 9 and 12, an indicator lamp 179, such as a low voltage incandescent lamp, is connected across the conductors 76 of the control circuit at each of stations A, B and C to give a visual indication when a tube has been found defective by the gauges at these respective stations.

After a tube 3 has been conveyed to and inspected by all the mechanisms at the three inspection stations of the machine and has been found to be free from defects of the kind described, it is carried by the conveyor to the part of the machine whereat the movable jaw 11 is opened by the cam 39 and the inspected tube allowed to drop onto the lowest chute 60 for further processing in the manufacture of an electric lamp including bases and stem tubes cemented and fused, respectively, to the collar sections 90 of the tubes.

A specific embodiment of the invention has been shown in the drawings and described above. It will be understood that changes in the form and details in the apparatus illustrated may be made by those skilled in the art without departure from the scope of the appended claims, for example, simple contact switches may be used in place of the totally enclosed snap action type of switches shown in the drawings.

What we claim as new and desire to secure by Letters Patent of the United States is:

1. An inspection apparatus for open ended cylindrical glass tubes having end collars comprising a conveyor for carrying a series of tubes in a position along a predetermined path in a direction transverse to the longitudinal axes of the tubes, means for driving said conveyor, a pair of tube end collar inspection mechanisms mounted along the sides of said path with one mechanism of the pair on each side of the path and with the mechanisms in opposing positions directly across said path, means supporting said mechanisms for reciprocation between an advanced tube end collar engaging position and a withdrawn tube end collar disengaging position and actuating means connected to the drive means for said conveyor for moving the inspection mechanisms simultaneously into said advanced and said withdrawn positions to inspect both end collars of a conveyed tube at the same time, said apparatus comprising also defective tube rejection means mounted along said path behind the inspection mechanisms in the direction of travel of the conveyed tubes and control means for said tube rejection means, said control means including parts of each of said inspection mechanisms, the said parts of each of said mechanisms being movable relative to each other independently of the corresponding parts of the other of said mechanisms into positions wherein said control means is made operable on detection by either of said inspection mechanisms of a defective tube end collar to cause rejection by said rejection means of an inspected tube having a defective end collar, and positions wherein said control means is made inoperable on inspection by said mechanisms of a tube having both collar sections free from defects, the relative positions of said parts of the respective inspection mechanisms while said mechanisms are in engagement with the tube end collars being determined by the physical condition of the engaged tube end collars.

2. An inspection apparatus for open-ended tubes comprising a conveyor for carrying a series of tubes along a predetermined path in a direction transverse to the longitudinal axes of the tubes, means for driving said conveyor, a pair of tube end inspection mechanisms mounted along the sides of said path with one mechanism of the pair on each side of the path and with the mechanisms in opposing positions directly across the said path, means supporting said mechanisms for reciprocation between an advanced tube end engaging position and a withdrawn tube end disengaging position and actuating means connected to the drive means for said conveyor for moving the inspection mechanisms simultaneously into said advance and said withdrawn positions to inspect both ends of a conveyed tube at the same time, said apparatus comprising also defective tube rejection means mounted along said path behind the inspection mechanisms in the direction of travel of the conveyed tubes and control means for said tube rejection means, each of said inspection mechanisms comprising a gauge having a plurality of resilient feeler wires mounted in angularly spaced positions in a common plane normal to an axis of the gauge and extending radially with respect to the said axis and a stop member for said wires engaging said wires in said plane and defining an opening exposing said wires for engagement by the end of a tube, means supporting said wires and said stop member with the wires pressing against said stop member and anchored at one end and free to move at the opposite end, the support means and the reciprocating means for said inspection mechanisms being adapted to advance said mechanisms toward the end of the tube with the common plane of the feeler wires of the gauges normal to the longitudinal axis of the inspected tube and for a distance sufficient first to press said feeler wires against the said tube ends and then to separate all of said feeler wires from said stop members only when the said tube ends are regular surfaces located in planes normal to the tube axis whereby at least one of said wires remains in engagement with the said stop member when the said tube ends are non-conforming to the said shape and location, said control means including an electrical circuit having all of said feeler wires on the one hand and said stop members on the other hand of both of said gauges as electrical contacts which establish continuity in the circuit and make the control means operable on detection by said inspection mechanisms of non-conforming tube ends to cause rejection by said rejection means of a tube having at least one defective end.

3. An inspection apparatus for open-ended cylindrical glass tubes having end collars comprising a conveyor for carrying a series of tubes in a position along a predetermined path in a direction transverse to the longitudinal axes of the tubes, means for driving said conveyor, a pair of tube end collar inspection mechanisms mounted along the sides of said path with one mechanism of the pair on each side of the path and with the mechanisms in opposing positions directly across said path, means supporting said mechanisms for reciprocation between an advanced tube end collar engaging position and a withdrawn tube end collar disengaging position and actuating means connected to the drive means for said conveyor for moving the inspection mechanisms simultaneously into said advanced and said withdrawn positions to inspect both end collars of a conveyed tube at the same time, said apparatus comprising also defective tube rejection means mounted along said path behind the inspection mechanisms in the direction of travel of the conveyed tubes and control means for said tube rejection means, each of said inspection mechanisms comprising a gauge having a centering cone member for insertion into and engagement with the sides of an open end of a conveyed tube, a ring contact member, a housing supporting said cone member with its tapering sides facing outward of the housing and supporting said ring contact member around said cone member and in floating relation therewith and a plurality of insulated electrical contact members mounted in angularly spaced relation on said housing with their contact surfaces opposed to said floating contact ring and located in a circle concentric with the axis of the cone and of larger diameter than the outer periphery of said floating ring contact, said ring contact defining a conical opening having sides flaring outwardly from the sides of said cone for engaging a conveyed tube at the part of said tube whereat the end collar section merges with the cylindrical part of the tube and exposing the sides of said cone for engagement by the termination of a collar section of the said tube, the support means and the reciprocating means for said inspection mechanisms being adapted to advance said mechanisms into engagement with the respective end collar sections of the tube and press the sides of the centering cone and the sides of the ring contact against the tube with sufficient force to shift said ring contact laterally into engagement with the contact surfaces of at least one of said insulated contact members only when an end collar section of the tube is eccentric with respect to the cylindrical part of the tube, said control means including an electrical circuit having all of said insulated electrical contacts on both gauges as one terminal thereof and the other parts of said gauges including said floating ring contact as the other terminal thereof whereby continuity in the said circuit is established and the control means is made operable on detection by said inspection mechanisms of an eccentric collar section on the inspected tube to cause rejection by said rejection means of a tube having at least one eccentric collar section.

4. An inspection apparatus for open-ended cylindrical glass tubes having end collars comprising a conveyor for carrying a series of tubes in a position along a predetermined path in a direction transverse to the longitudinal axes of the tubes, means for driving said conveyor, a pair of tube end collar inspection mechanisms mounted along the sides of said path with one mechanism of the pair on each side of the path and with the mechanisms in opposing positions directly across said path, means supporting said mechanisms for reciprocation between an advanced tube end collar engaging position and a withdrawn tube end collar disengaging position and actuating means connected to the drive means for said conveyor for moving the inspection mechanisms simultaneously into said advanced and said withdrawn positions to inspect both end collars of a conveyed tube at the same time, said apparatus comprising also defective tube rejection means mounted along said path behind the inspection mechanisms in the direction of travel of the conveyed tubes and control means for said tube rejection means, each of said inspection mechanisms comprising a gauge having a hollow block provided with an opening for receiving and engaging the tube end collar at a circumferential line of predetermined diameter and a disc member mounted for reciprocation in said block and spring biased toward the said opening so as to engage the tube termination on the tube collar received within the said block opening, the hollow block of one of said gauges being affixed to the corresponding support for the inspection mechanism and the hollow block of the other of said gauges being mounted for reciprocation on the corresponding support of the inspection mechanism and being spring biased in the direction of the opposed block whereby the distance between said blocks in the advanced positions of said mechanisms is determined by the distance between the said circumferential lines on a tube engaged by said mechanisms, each of said discs in the advanced positions of said mechanisms butting against a termination of the engaged tube whereby the distance between each of said discs and the sides of the opening in the respective block is determined by the distance between the said circumferential line on the respective tube end collar and the termination of the tube end received in said block, said control means including an electrical circuit having electric switches mounted on said inspection mechanisms and actuated by said spring biased block and said discs, said switches being connected in parallel in said circuit and being mounted in pairs on said mechanisms, one pair of said switches being actuated by said spring biased block and other pairs of said switches being actuated by each of said discs, all of the switches being in an open circuit position when the distances between said circumferential lines on the one hand and the distances between the tube terminations and the adjacent circumferential lines on the other hand are within predetermined limits and at least one of said switches being in a closed circuit position when any of said distances are without said limits to establish continuity in the said circuit and make the control means operable on detection by said inspection mechanisms of any distance between said tube parts outside the said predetermined limits and thereby cause rejection by said rejection means of a defective tube.

5. In combination, a conveyor of the indexing type for carrying open-ended tubular lamp envelopes in succession to a plurality of inspection stations arranged along the conveyor drive means for said conveyor including a continuous drive member, envelope end defect detecting mechanisms mounted in opposed positions at each of said stations, a support for each of said mechanisms at each of said stations reciprocable between an advanced position and a withdrawn position with respect to the end of the conveyed envelopes for carrying said detecting mechanisms into and out of engagement with the envelope ends, actuating means for said reciprocal supports connected to the continuous drive member of said conveyor to move said supports simultaneously from a withdrawn to an advanced position and back again during each dwell of the conveyor, an envelope reject mechanism mounted beyond each of said stations in the direction of travel of the conveyor, each of said reject mechanisms including an actuating solenoid for setting said reject mechanism in position to reject from the conveyor an envelope found defective at its ends by the detecting mechanisms at the corresponding pair of stations, means including contacts on said detecting mechanisms for electrically connecting the detecting mechanisms at each of said pairs of stations in parallel in a circuit including a relay for controlling the operation of the actuating solenoid of the reject mechanism for said pair of stations, each of said detecting mechanisms including means controlled by the condition of the envelope ends for selectively opening and closing said contacts, and means connected to the continuous drive member for momentarily energizing the control circuit with the conveyor at dwell and with the detecting mechanisms in engagement with the envelope ends, all of the contacts on said detecting mechanisms at each station being open when the envelope ends engaged by the detecting mechanisms are free from defects and one or more of said contacts being closed when the envelope ends are defective to establish continuity in the control circuit and thereby cause rejection of an envelope with a defective end.

References Cited in the file of this patent

UNITED STATES PATENTS

| | | |
|---|---|---|
| 2,251,949 | Pechy | Aug. 12, 1941 |
| 2,551,645 | Stadelman | May 8, 1951 |